United States Patent [19]
Hasquenoph et al.

[11] 3,840,201
[45] Oct. 8, 1974

[54] DEVICE FOR STEADYING LOADS SUSPENDED FROM AIRCRAFTS

[75] Inventors: Jean Henri Hasquenoph, Lagny; Pierre Fernand Coutin, Paris, both of France

[73] Assignee: R. Alkan & Cie, Valenton, France

[22] Filed: June 1, 1973

[21] Appl. No.: 366,054

[30] Foreign Application Priority Data
June 9, 1972 France .............................. 72.20897

[52] U.S. Cl. ............................ 244/137 R, 89/1.5 G
[51] Int. Cl................................................. B64d 1/08
[58] Field of Search .................. 244/137 R, 118 R; 89/1.5 R, 1.5 A, 1.5 B, 1.5 C, 1.5 D, 1.5 F, 1.5 G, 1.5 H; 294/83 R, 83 A, 83 AB, 102 R

[56] References Cited
UNITED STATES PATENTS
3,268,188  8/1966  LaRoe et al. ............... 244/137 R X
3,784,132  1/1974  Newell .......................... 244/137 R Primary Examiner—Lloyd L. King
Assistant Examiner—Randolph A. Reese
Attorney, Agent, or Firm—Ulle C. Linton

[57] ABSTRACT

This device for steadying, notably against laterial oscillation, a load releasably suspended from an aircraft comprises, associated with each suspension hook, a pair of wedge members disposed transversely on one and the other sides of the load axis and resiliently urged to fit between the load and the carrier member of the aircraft; each wedge member is automatically retracted, when opening the hook, by a cam portion of said hook which engages one end of a pivoting lever of which the other end is secured to the wedge member.

1 Claim, 2 Drawing Figures

PATENTED OCT 8 1974　　　　　　　　　　3,840,201

DEVICE FOR STEADYING LOADS SUSPENDED FROM AIRCRAFTS

BACKGROUND OF THE INVENTION

1. Field of the invention

The present invention relates to means for steadying loads suspended from aircrafts.

2. Brief description of the prior art

It is known that loads suspended from aircrafts comprise as a rule tapped cavities engaged by correspondingly screw-threaded shanks formed integrally with suspension rings. The hooks carried by the supporting or jettisoning device engage these rings for actually carrying the load. Since these rings are aligned longitudinally, the loads tend to oscillate laterally under the influence of lateral accelerations or other aerodynamic effects, so that it is customary to steady these loads, when supported by the aircraft, by means of transverse bearing elements.

An arrangement generally employed to this end consists in utilizing four steadying or wedging screws engaging tapped orifices formed in four fixed bearing arms and clamping the load laterally.

This arrangement, although very efficient, has various drawbacks: in fact, the bearing arms are relatively heavy and the assembly including the four wedging or steadying screws is objectionable on account of its poor aerodynamic contour. On the other hand, the steadying operation proper requires the tightening of four screws.

SUMMARY OF THE INVENTION

It is the essential object of the present invention to provide an improved device for steadying loads suspended from aircrafts which eliminates the inconveniences of prior art systems, while reducing or even eliminating the span of the bearing arms and ensuring in certain cases the automatic steadying of the load without requiring any particular manoeuvre, except the closing of the load suspension hooks.

The principle, known per se, on which the present invention is based, consists in interposing between the support and the load a plurality of spring-urged wedges. If play tends to develop, the corresponding wedge is thrusted farther inwards and the load remains wedged in position. When removing or jettisoning the load, the hook opening movement is attended by the withdrawal of the wedges which are thus properly retracted to permit the fitting of another load. The device operates automatically in that the only manoeuvre necessary for suspending a fresh load is the usual hook closing movement.

A typical form of embodiment of the present invention will now be described in detail with reference to the attached drawings, in which:

DESCRIPTION OF THE PREFERRED EMBODIMENT

Figure 1:
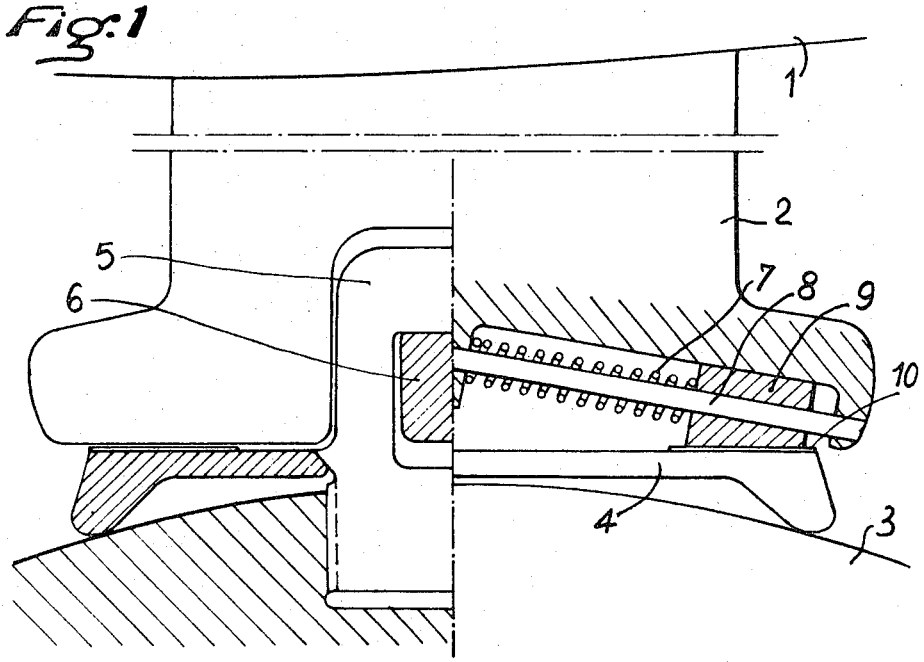
FIGS. 1 and 2 illustrate diagrammatically in vertical and horizontal section, respectively, a steadying or wedging device utilizing transversely movable wedge members adapted to be retracted automatically.
Figure 2:
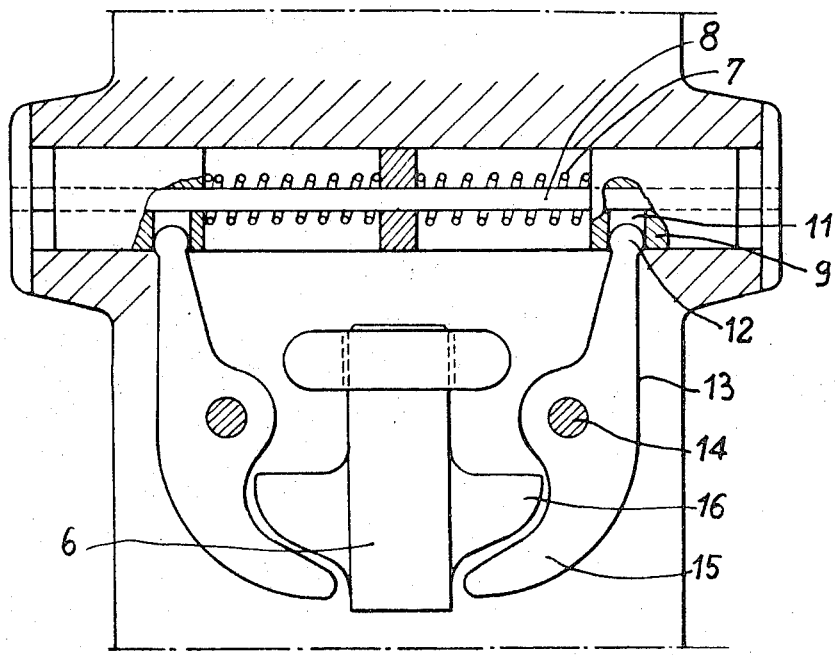

Reference will first be made to FIGS. 1 and 2 of which FIG. 1 is a vertical cross-sectional view of the device, the left-hand half-section being made in a plane containing the axis of one of the hooking rings, the right-hand half-section being made in a plane containing the axis of one of the steadying wedge members. The reference numeral 1 designates an aircraft structure element, 2 being the vertical streamlined support usually interposed between the aircraft structure and the load to be carried outside and below the aircraft, this load being shown at 3 and assumed to be of substantially cylindrical configuration, as in most instances. The reference numeral 5 designates one of the two rings screwed at standardized locations along the uppermost generatrix of the load 3. This ring 5 is adapted to press with force an intermediate member 4 against the cylindrical surface of the load 3, said intermediate member 4 comprising a plane upper surface 10 engaged by wedge members. The reference numeral 6 designates one of the two hooks in its closed position. It engages the central aperture of ring 5 and thus supports the load 3. The wedge member 9 urged in the transverse direction by the corresponding spring 7 is adapted to take up any play likely to develop thereat between the support 2 and load 3. The same applies to the other wedge member disposed symmetrically thereto, so that the load cannot oscillate transversely. A rod 8 is provided for centering the spring 7 and guide the wedge member 9 with a sufficient clearance while preventing the accidental loss of either of these component elements.

FIG. 2 is a horizontal section taken through the wedge members 9 in their operative position and shows the means for automatically controlling the withdrawal of these wedge members. The support 2 has fulcrumed therein, by means of vertical pins 14, a pair of levers 13. Each lever 13 comprises at one end a finger 12 engaging a notch 11 of a wedge member 9 and is adapted to be actuated by cam means acting upon its opposite end 15. To this end, the hook 6 engaging the ring 5 is formed with a pair of cam-shaped lateral projections 16 and the arrangement is such that when the hooks are opened the cams 16 engage the ends 15 of levers 13 and these levers oscillate about the pivot pin 14, thus moving the wedge members 9 to their retracted position against the force of spring 7; under these conditions, the load is released and since the hooks 6 have a stable open position the wedge members 9 remain in their retracted position.

What we claim is:

1. Device for steadying loads suspended from aircrafts, in which the load is suspended by means of rings detachably connected to a pair of axially spaced hooks on a carrier member of the aircraft, comprising hooks being pivotally mounted to pivot in a common vertical plane, a pair of wedge members associated with each hook, the wedge member of each pair thereof being disposed in spaced relationship transversally with respect to the load axis, a single spring acting on each wedge member forcing its wedge member between the load and the carrier member of the aircraft to ensure the steadying of the load with respect to said carrier member, cam portions provided on said hooks, and a pair of levers associated with each hook and pivotally connected to the carrier member, each lever having one end engaging a wedge member while its opposite end is positioned for being engaged by a cam portion of the corresponding hook during the opening movement to cause the automatic retraction of the corresponding wedge member.

* * * * *